Figure 1A:
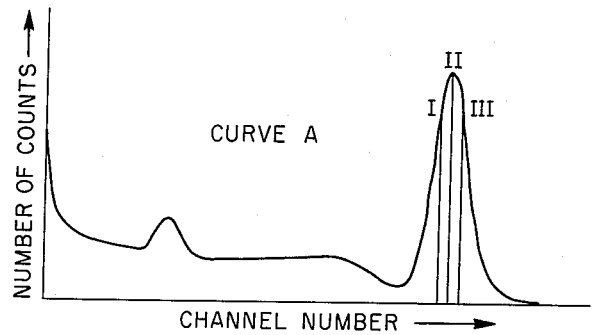

Aug. 20, 1963 L. E. FITE 3,101,409
DRIFT CONTROL IN AN ANALYTICAL GAMMA RAY SPECTROMETER
Filed May 3, 1962 3 Sheets-Sheet 1

INVENTOR.
Lloyd E. Fite
BY
ATTORNEY.

INVENTOR.
Lloyd E. Fite

INVENTOR.
Lloyd E. Fite

United States Patent Office 3,101,409
Patented Aug. 20, 1963

3,101,409
DRIFT CONTROL IN AN ANALYTICAL GAMMA RAY SPECTROMETER
Lloyd E. Fite, Bryan, Tex., assignor to the United States of America as represented by the United States Atomic Energy Commission
Filed May 3, 1962, Ser. No. 192,295
4 Claims. (Cl. 250—71.5)

This invention relates to a system for automatically and continuously controlling the overall drift of a multi-channel analyzer so as to permit the accurate processing of spectrometric analytical data by a digital computer.

When an element is bombarded by neutrons, some of its nuclei undergo neutron capture and become radioactive. If these now radioactive atoms decay with the emission of gamma rays, the energy level or levels of the gamma rays emitted and the rate of emission are characteristics of the atoms. The bombarded material can be identified both by the energy of the gamma rays emitted and the rate at which they are being emitted. The number of gamma rays detected per unit time is a function of the bombarding neutron flux, the irradiation time, the counting time, the activation cross section of the bombarded material, and the efficiency of the counting system.

Information regarding all of the above parameters is required for qualitative and quantitative activation analysis. The numerical values of the flux, activation cross section, and the efficiency of the counting system are difficult to measure precisely, but comparisons between the unknown sample and a known standard activated and counted under identical conditions can be used for analytical purposes.

When gamma rays interact with the atoms of a NaI(Tl) crystal, the crystal emits visible light, which is proportional in intensity to the energy deposited by the gamma rays in the crsytal. A photomultiplier, optically coupled to the crystal, produces a voltage pulse proportional in magnitude to the light striking the photocathode. The resultant voltage pulse can then be amplified and stored in a ferrite core memory of a multi-channel analyzer. The channels of the analyzer correspond to energy intervals of the gamma ray spectrum and the number of pulses counted and stored in the various channels is, therefore, a function of the characteristic gamma ray spectrum of the radioactive materials being counted.

In order to permit rapid and low-cost analytical gamma ray spectrometry, the spectrometer can be coupled to a digital computer for the purpose of processing the data. It is when such coupling is desired that drifts of the gamma ray spectrometer become particularly undesirable, because the characteristics of the gamma ray spectra appear to change, whereas, of course, they are constant. It is therefore essential to control the drift of a gamma ray spectrometer which is coupled to a computer.

The present drift control system was designed for use with a computer coupled automatic activation analysis system such as described in A.E.C. Report No. TEES-2565-1, 1960.

There are at least two prior art methods for controlling drift of gamma ray spectrometers. One of these methods is described by Scherbatskoy, S. A., "Stabilized Scintillation Counter," Review of Scientific Instruments, vol. 32, No. 5, page 599, May 1961. The other of these methods is described by De Waard, H., "Stabilizing Scintillator Spectrometers with Counting-Rate Difference Feedback," Nucleonics, vol. 73, No. 7, pages 36–41, July 1955. However, neither of these prior methods provides a means for controlling the drift of the lower discriminator or threshold energies. The control of drift in the lower energy levels is of special importance when data from all channels are utilized in spectrometric measurements. In addition, neither of these prior methods compensates for gain changes within the pulse height analyzer itself.

With a knowledge of the limitations of the above prior control methods, it is a primary object of this invention to provide a system for automatically and continuously controlling the overall drift of a multi-channel analyzer so as to permit the accurate processing of spectrometric analytical data by a digital computer.

It is another object of this invention to provide a system for automatically and continuously controlling the overall drifts of a multi-channel analyzer which are due to fluctuations in line voltage, high voltage supply, and photomultiplier and amplifier gain.

Figure 1B:
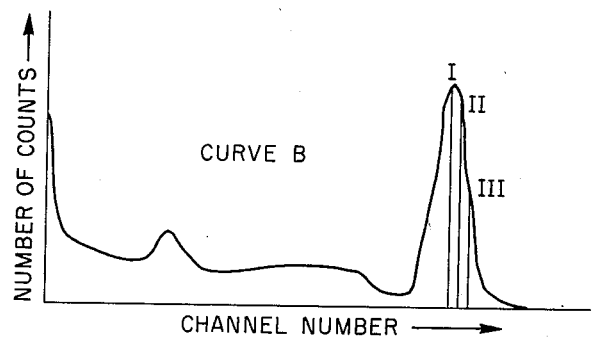
Figure 1C:
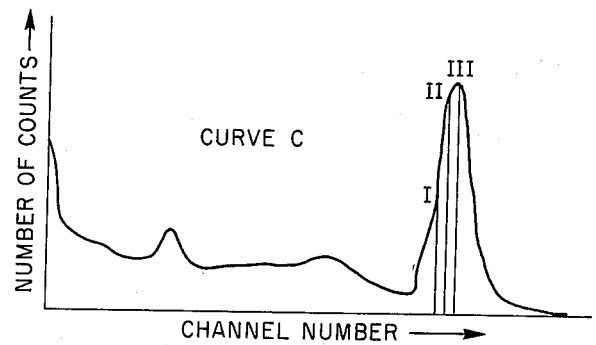
Figure 2:
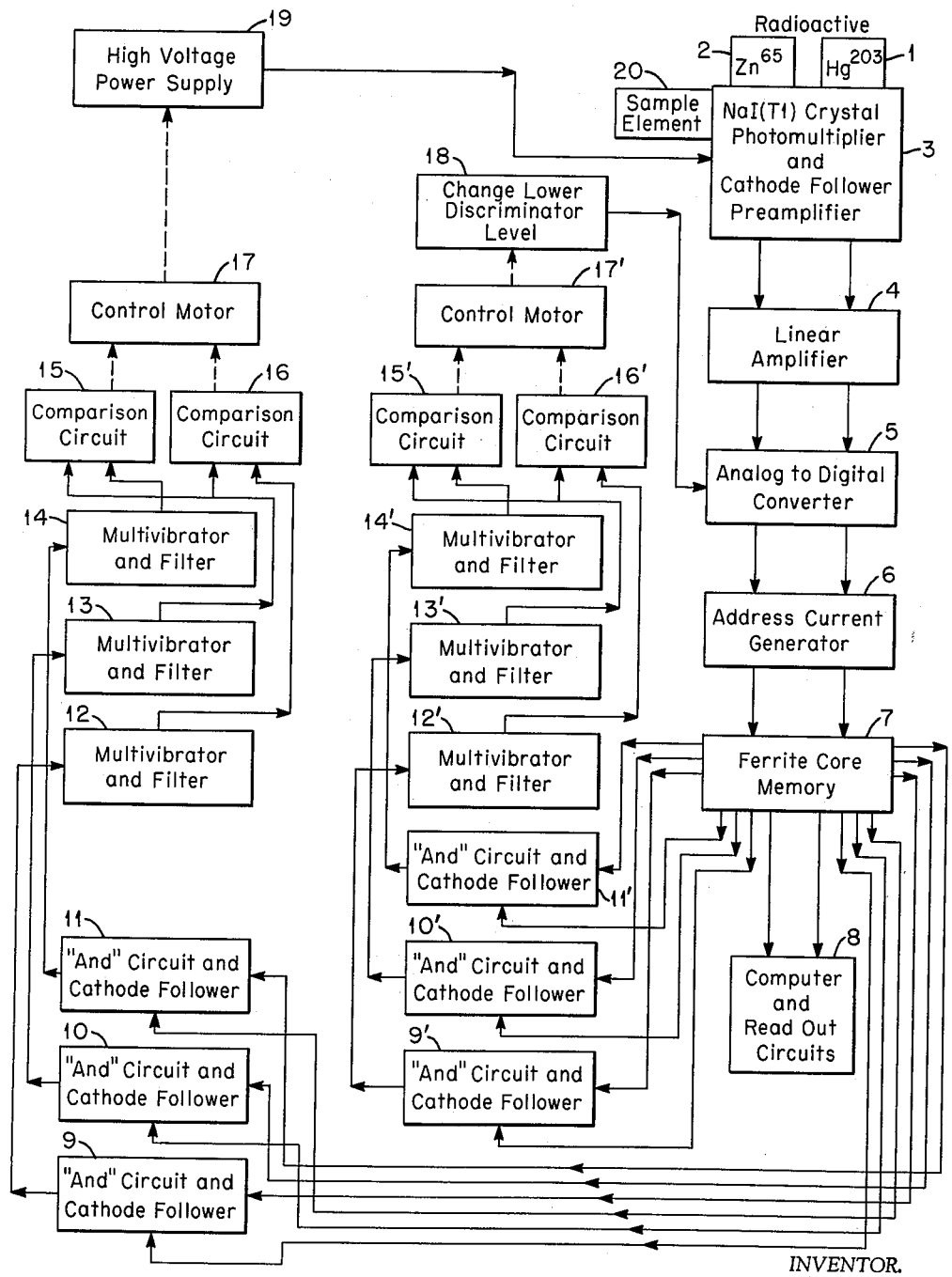
Figure 3:
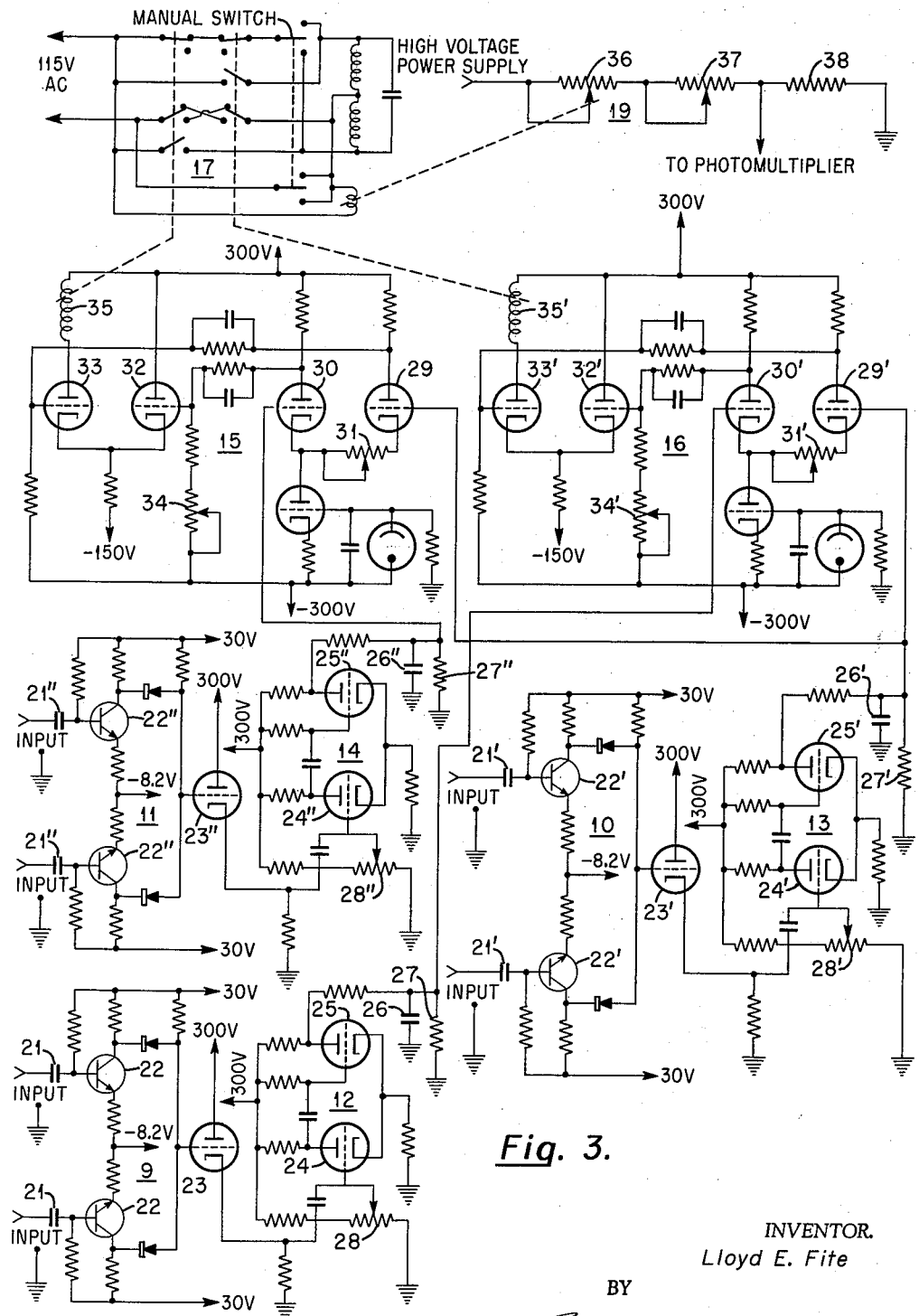

These and other objects and advantages of this invention will become apparent upon consideration of the following detailed specification and the accompanying drawings, wherein:

FIGS. 1a, 1b, and 1c are a series of graphs showing a typical gamma ray spectrum and variations of the photopeak under conditions of no drift, downward drift, and upward drift of a gamma ray spectrometer;

FIG. 2 is a block diagram of the drift control system of the present invention; and FIG. 3 is a detailed circuit diagram of some of the components of FIG. 2 which illustrates the drift control system for regulating the high voltage supply for the photomultiplier.

The above objects have been accomplished in the present invention by providing two sources of reference pulses, one of which is stored in the lower channels and the other of which is stored in the higher channels of a 256 channel analyzer. The reference pulses are processed in the same manner as the data pulses and are stored in a ferrite core memory. The channels which should contain the reference pulses and the adjacent channels above and below those channels are monitored by "AND" circuits. The "AND" circuits of each group are coupled to multivibrators through cathode followers, and the multivibrators are coupled to comparison circuits such that any drift, upward or downward, of the reference pulses is detected to effect a change in the high voltage supply in response to a drift in the upper channel, and to effect a change in the lower discriminator level of the analog to digital converter of the analyzer in response to a drift in the lower channel. Thus, any drift in the upper or lower channels is automatically controlled to maintain the pulses in the proper channels.

FIGS. 1a, 1b, and 1c illustrate a typical gamma ray spectrum. Curve A of FIG. 1a shows the desired location of the photopeak of the reference pulses in channel II. Three channels are monitored, noted as I, II, and III, to determine if the photopeak is located in the proper channel. The count-rate difference between channel II and channel I and between channels II and III is positive indicating that the photopeak is in the correct channel, that being channel II. In curve B of FIG. 1b, the count-rate difference between channels II and III remains positive while the count-rate difference between channels II and I becomes negative. This indicates a downward drift of the gamma ray spectrometer. Curve C of FIG. 1c illustrates an upward drift in the counting system since the count-rate difference between channels II and III is now negative while the count-rate difference between channels II and I is still positive. It should be noted that the three monitored channels of FIGS. 1a, 1b, and 1c are located in the upper channels of the analyzer. It should be understood that there are three other monitored channels located in the lower channels of the analyzer.

The count-rate differences between the channels determine the direction of the drift of the gamma ray spectrometer and enable the drift control system, to be described below, to recognize and to correct for any drift that occurs by keeping both count-rate differences between channels II and I and between channels II and III positive.

In the drift control system, illustrated in FIG. 2, two sources are used to provide two separate sources of reference pulses. The first source 1 of reference pulses, which are stored in the lower channels, is obtained from radioactive mercury[203], for example, which emits gamma rays with a peak at 279 kev. These pulses are used to control the lower discriminator level in the analog to digital converter. The second source of reference pulses 2, which are stored in the higher channels, is obtained from radioactive zinc[65], for example, which emits gamma rays with a peak at 1.11 mev. These sources of reference pulses are given by way of example only. Other reference sources may be used. For example, radioactive plutonium 239, an alpha emitter, may be used instead of $Zn^{65}$ as a reference in the higher channels, and radioactive cerium[144] may be used instead of mercury[203] as a reference in the lower channels. Plutonium 238 emits alpha rays with a peak at about 2.9 mev., while cerium[144] emits gamma rays with a peak energy of 133 kev.

The gamma rays from reference sources 1 and 2, as well as the gamma rays from a neutron bombarded element 20 to be analyzed, interact with the atoms of a NaI(Tl) crystal which emits visible light, which is proportional in intensity to the energy deposited by the gamma rays in the crystal. A Du Mont 6363 photomultiplier in the component 3 is optically coupled to the crystal. The output from the photomultiplier is coupled to a cathode follower preamplifier. The output of the preamplifier is further amplified and stored in the ferrite core memory of a multi-channel analyzer. The components 4, 5, 6 and 7 of FIG. 2, which are coupled to the output of the preamplifier of the component 3, may be a 256 channel pulse height analyzer such as described by Schumann, R. W., and McMahon, J. P., "Argonne 256 Channel Pulse Height Analyzer," Review of Scientific Instruments, vol. 27, No. 9, pages 675–685, September 1956. A computer and read-out circuits unit 8 is coupled to the ferrite core memory 7 of the analyzer. The computer may be an IBM 709 computer, for example. In order for the pulses in the gamma ray spectrum to fall in the proper channels before being fed to the computer for processing, the upper and lower channels of the analyzer are monitored by suitable drift control circuits in the following manner.

The photomultiplier of component 3 in FIG. 2 is coupled to a Hamner N401 high voltage power supply 19. Power supply 19 is regulated by a Sola transformer. The power supply 19 is also adjusted by a drift control system coupled thereto and to the upper channels of the analyzer. The reference pulses from source 2 in the upper channels are processed in the same manner as data pulses and are stored in the ferrite core memory. The channel which should contain the reference pulses and the adjacent channels above and below this channel are monitored by "AND" circuits 9, 10, and 11, coupled to the address wires of the ferrite core memory 7. The signals from the "AND" circuits are applied to cathode followers. The cathode followers match the impedance from the "AND" circuits to the cathode coupled monostable multivibrators 12, 13, and 14.

The outputs of the multivibrators are filtered and applied to comparison circuits 15 and 16 which determine if the photopeak is located in the "correct" channel by comparing the count-rate differences between the "correct" channel and the channels above and below it. A plate relay in each comparison circuit, which is normally open, is energized when an error signal develops, and is de-energized when the count rate of the "correct" channel is higher than that of the adjacent channel connected to each of the respective comparison circuits. Comparison circuit 15 compares the outputs of multivibrators 13, 14, while comparison circuit 16 compares the outputs of multivibrators 13, 12. Multivibrator 13 is associated with the "correct" channel. The plate relays of comparison circuits 15 and 16 are coupled to a reversible control motor 17 such that one of the relays when energized will cause the motor 17 to rotate in one direction and the other of the relays when energized will cause the motor 17 to rotate in the opposite direction. The motor 17 is mechanically coupled to an adjustable 10K ohm, ten-turn Helipot resistance which controls the high voltage supply to the photomultiplier in a manner to be more fully described below in connection with FIG. 3.

The same procedure is followed when drift occurs in the lower reference channel. The components 9'–17' perform the same functions as the components 9–17, described above for the upper channels, except that the control 18 varied is for controlling the lower discriminator level in the analog to digital converter 5 of the multichannel analyzer. Thus, the overall drift of the analyzer, which may be due to fluctuations in line voltage, high voltage supply, and photomultiplier and amplifier gain, is automatically and continuously controlled to maintain the reference pulses in the "correct" channels such that the computer can accurately process the data furnished by the pulse height analyzer.

Referring now to FIG. 3, the components 9–17 and 19 of FIG. 2 are shown in detail. Since the respective drift control circuits for the upper and lower channels of the analyzer function in the same manner, a detailed description of only one of these drift control circuits will be given. For a description of the pulse height analyzer, reference is made to the above mentioned article in Review of Scientific Instruments.

In FIG. 3, the inputs to the gate circuits 9, 10, and 11 are connected to the memory address wires of the three channels to be monitored in the upper channels of the ferrite core memory 7 of the analyzer of FIG. 2. Each of the "AND" circuits makes it possible to "AND" together the vertical and horizontal address signals of the ferrite core memory and obtain an output only when a count is stored in a particular channel. Each individual address wire is pulsed for a range of 16 channels, but only one combination of vertical and horizontal wires is used for any given channel. The inputs from the ferrite core memory to the "AND" circuits 9, 10, and 11 are coupled through condensers 21, 21', and 21'', respectively. Since the voltage pulses required to store a count in the memory are only two volts in magnitude, the transistor amplifiers 22, 22', and 22'' are required to provide output pulses of sufficient amplitude to operate the "AND" circuits. When a count is to be stored in a particular channel, the counts already present in that channel are read out by applying a negative two-volt, 3 μsec. pulse to the address wires in the memory. This negative pulse is sufficient to cut off the transistors of the "AND" circuits and supply the "AND" circuits with a 30-volt pulse.

The outputs from the "AND" circuits consist of a series of positive pulses and these outputs are applied to cathode followers 23, 23', and 23'', respectively. The cathode followers match the impedance from the "AND" circuits to the cathode coupled monostable multivibrators 12, 13, and 14, respectively. The cathode followers 23, 23', and 23'' are coupled to the multivibrators 12, 13, and 14, respectively, through potentiometers 28, 28', and 28'', respectively. These potentiometers are used to adjust the trigger level of each multivibrator. The multivibrators 12, 13, and 14 include vacuum tubes 24, 25; vacuum tubes 24', 25'; and vacuum tubes 24'', 25'', respectively; output filter condensers 26, 26', and 26'', respectively; and output filter resistors 27, 27', and 27'', respectively. The plate load resistors of the normally conducting tubes 25, 25', and 25'' each have a resistance of about 10K ohms, and the cathode resistors of these tubes have a resistance of about 8.3K ohms to limit the current drain of the multivibrators to about 10 milliamperes. Each of the filter condensers 26, 26', and 26" has a capacitance of about 0.1 µfd., and each of the filter resistors 27, 27', and 27" has a resistance of about 10 megohms.

The filtered outputs of multivibrators 12, 13, and 14 are connected to the comparison circuits 15 and 16 as shown in FIG. 3. The output of multivibrator 13 is connected to the grids of vacuum tubes 29 and 29' in comparison circuits 15 and 16, respectively. The output of multivibrator 14 is connected to the grid of a vacuum tube 30 in comparison circuit 15, and the output of multivibrator 12 is connected to the grid of a vacuum tube 30' in comparison circuit 16. Thus, the comparison amplifier tubes 29 and 30 of circuit 15 compare the outputs of multivibrators 13 and 14, while the comparison amplifier tubes 29' and 30' of circuit 16 compare the outputs of multivibrators 13 and 12. A 100K ohm potentiometer 31 and 31' is connected in each of the cathode circuits of the comparison amplifiers of circuits 15 and 16, respectively, to provide sufficient bias to these stages to give approximately equal anode voltages when the center of the photopeak is located in the proper channel. The use of these potentiometers increases the sensitivity of the comparison circuits and enables them to detect smaller differences in count rates and improves the ability of the system to control drift.

Amplifier tubes 32 and 33 are coupled to tubes 29 and 30, respectively, in comparison circuit 15 and amplifier tubes 32' and 33' are coupled to tubes 29' and 30', respectively, in comparison circuit 16. A 10K ohm plate relay 35 is connected to tube 33 in circuit 15, and a 10K ohm plate relay 35' is connected to tube 33' in circuit 16.

A 1 megohm potentiometer 34 is connected to the grid of tube 32, and a 1 megohm potentiometer 34' is connected to the grid of tube 32' in the respective comparison circuits. These potentiometers are adjusted so that the plate relays 35 and 35' will energize or de-energize when the signal voltage varies by ±0.2 volt.

The contacts of relays 35 and 35' are connected in the control circuits of a reversible control motor 17 as shown in FIG. 3. Motor 17 is a 1 r.p.m. reversible motor capable of stopping within a half degree. The starting and the direction of rotation of motor 17 is determined by one of the two plate relays 35, 35' or the manual switch. Either of the plate relays override the manual switch, and, if both relays are energized at the same instant of time, then the rotation of the motor is interrupted. The position of the relay contacts as shown in FIG. 3 is when both relays are de-energized.

Control motor 17 is coupled to the potentiometer arm of a 10K ohm, ten-turn Helipot 36 placed in series with the high voltage power supply 19. Helipot 36 is connected to ground through a 100K ohm potentiometer 37 and a 1 megohm resistor 38. The junction between potentiometer 37 and resistor 38 is connected to the photomultiplier of FIG. 2.

In a typical operation of the drift control system described above, if the gain of the gamma ray spectrometer decreases, allowing the maximum count in the photopeak to fall in channel N−1 instead of N, for instance, multivibrator connected to the address wires corresponding to channel N−1, through the corresponding "AND" circuit, will be triggered more frequently. The output from the filter corresponding to the lower adjacent channel will rise, while the output from the filter corresponding to the "correct" channel will decrease. The corresponding comparison circuit will detect the changing difference in the count rates and, when the filter outputs are changed sufficiently, the appropriate plate relay will energize. This causes motor 17 to rotate, changing the resistance of Helipot 36 which controls the high voltage supply to the photomultiplier. As the high voltage is increased, the gain of the photomultiplier is increased until the maximum count in the photopeak is again placed in the "correct" channel N. The same operation takes place for increasing gain, except the upper adjacent channel is compared with the "correct" channel, thus causing the motor 17 to rotate in the opposite direction, decreasing the voltage applied to the photomultiplier until the maximum count in the photopeak is again placed in the "correct" channel.

It should be noted that in some cases it may be necessary to monitor channels N and N±2 rather than N and N±1 in order to obtain sufficient count-rate differences to operate the comparison circuits satisfactorily. This can easily be done by connecting the address wires in the ferrite core memory of the particular channels it is desired to monitor to the appropriate "AND" circuits of the drift control system.

The drift control system described above is able to vary the photopeak five channels either side of the reference channel and any drift greater than this would have to be corrected manually. By varying the Helipot 36 in the high voltage supply, it is possible to move the photopeak by ten channels.

When the drift occurs in the lower reference channel, the components 9'–17' of FIG. 2 operate in the same manner as components 9–17 in the upper reference channel to vary the lower discriminator level in the analog to digital converter 5 of the multi-channel analyzer to maintain the reference photopeak in the correct lower channel. The component 18 of FIG. 2 includes a 140-volt power supply connected in series with a 10K ohm, 10-turn Helipot and a 100K ohm, 10-turn Helipot. The former Helipot is varied by the control motor 17' connected thereto and the output of this Helipot is used to vary the discriminator level in the analog to digital converter 5 to thus maintain the reference photopeak in the "correct" lower channel. The maximum channel variation of this control in the lower discriminator level is also ten channels with any greater variation being corrected manually.

It can be seen from the above description of the drift control circuits of the present invention that the overall drift in the pulse height analyzer that may be due to fluctuations in line voltage, high voltage supply, and photomultiplier and amplifier gain can be automatically and continuously adjusted to maintain the reference photopeaks in the upper and lower channels in their "correct" channels, thereby presenting a substantially accurate gamma ray spectrum to data analysis computer coupled to the analyzer.

This invention has been described by way of illustration rather than limitation and it should be apparent that the present invention is equally applicable in fields other than those described.

What is claimed is:

1. In a multi-channel pulse height analyzer for analyzing the gamma ray spectrum of a neutron bombarded sample element, including a gamma ray detector coupled to said sample element and to a photomultiplier provided with a high voltage supply, said photomultiplier being coupled to a cathode follower, preamplifier, linear amplifier, analog to digital converter, address current generator, ferrite core memory, and a computer, the improvement comprising means for automatically and continuously adjusting the overall drift of said analyzer due to fluctuations in line voltage, high voltage supply, and photomultiplier and amplifier gain, said means comprising a first source of radioactive reference pulses coupled to said gamma ray detector for providing a first reference photopeak in one of the lower channels of said analyzer, a second source of radioactive reference pulses coupled to said gamma ray detector for providing a second reference photopeak in one of the upper channels of said analyzer, first means coupled to said ferrite core memory for monitoring said one lower channel and each channel above and below said one lower channel for any drift which may occur in these lower channels, means coupled to said first monitoring means and responsive to any drift upward or downward of said first reference photopeak in said lower channels for automatically changing the lower discriminator level in said analog to digital converter to thereby maintain said first reference photopeak in said one lower channel, second means coupled to said ferrite core memory for monitoring said one upper channel and each channel above and below said one upper channel for any drift which may occur in these upper channels, and means coupled to said second monitoring means and responsive to any drift upward or downward of said second reference photopeak in said upper channels for automatically adjusting the high voltage supply to said photomultiplier to thereby maintain said second reference photopeak in said one upper channel.

2. The drift control system set forth in claim 1, wherein said first and second monitoring means comprises "AND" circuits and cathode followers coupled to the address wires of said lower and upper monitored channels in said ferrite core memory, respectively, said means coupled to said first and second monitoring means for changing said lower discriminator level and said high voltage supply, respectively, including a multivibrator and filter coupled to each of said "AND" circuits and cathode followers, comparison circuits coupled to said multivibrators and filters for comparing the count-rate differences between said lower monitored channels and the count-rate differences between said upper monitored channels, respectively, and control means coupled to said comparison circuits, respectively, and coupled to said lower discriminator level of said analog to digital converter and to said high voltage supply, respectively, for automatic adjustments thereto in response to any drift of said reference photopeaks in said lower and upper channels of said analyzer.

3. The drift control system set forth in claim 2, wherein said first source of radioactive reference pulses is obtained from mercury$^{203}$, and said second source of radioactive reference pulses is obtained from zinc$^{65}$.

4. The drift control system set forth in claim 2, wherein each of said control means coupled to said comparison circuits comprises a reversible control motor, each of said motors being energized, respectively, in response to any drift of said first and second reference photopeaks in said analyzer to thereby effect said adjustments to said lower discriminator level and to said high voltage power supply, respectively, said control motors rotating in one direction or the other depending upon the direction of drift of said reference photopeaks in said analyzer.

References Cited in the file of this patent
UNITED STATES PATENTS

| | | |
|---|---|---|
| 2,829,268 | Chope | Apr. 1, 1958 |
| 2,884,530 | Foster | Apr. 28, 1959 |
| 2,943,199 | Konneker | June 28, 1960 |